United States Patent [19]

Grotloh

[11] Patent Number: 4,552,330

[45] Date of Patent: Nov. 12, 1985

[54] PRESSURE MEDIUM ACTUATED VALVE

[75] Inventor: Karl H. Grotloh, Winterthur, Switzerland

[73] Assignee: Sulzer Brothers Limited, Winterthur, Switzerland

[21] Appl. No.: 611,091

[22] Filed: May 17, 1984

[30] Foreign Application Priority Data

May 19, 1983 [CH] Switzerland ............. 2731/83
Jan. 10, 1984 [CH] Switzerland ............. 410/84

[51] Int. Cl.[4] ........................................... F16K 31/124
[52] U.S. Cl. ................................ 251/30.01; 251/25; 251/31; 91/415; 91/416
[58] Field of Search ............... 251/25, 30, 31; 91/415, 91/416

[56] References Cited

U.S. PATENT DOCUMENTS

| 2,587,539 | 2/1952 | Seaman | 251/25 X |
| 2,780,204 | 2/1957 | Barley | 91/415 X |
| 2,830,784 | 4/1958 | Placette | 251/14 |
| 2,986,368 | 5/1961 | Moore | 251/30 |
| 3,491,982 | 1/1970 | Gascoigne | 251/30 |
| 3,746,299 | 7/1973 | Lewis | 251/25 |
| 3,814,375 | 6/1974 | Grotloh | 251/28 |
| 3,892,381 | 7/1975 | Prescott et al. | 251/26 |

Primary Examiner—Samuel Scott
Assistant Examiner—Allen J. Flanigan
Attorney, Agent, or Firm—Kenyon & Kenyon

[57] ABSTRACT

The pressure medium actuated valve has a pressure medium inlet port, an outlet port and a cylinder in which a piston connected to a closure member can slide. The piston sub-divides the cylinder into a first cylinder space and a second cylinder space. Two relief conduits, each containing a control valve are connected to the cylinder spaces and extend to a pressure medium sink. A first connecting conduit containing a control valve extends from the inlet port to the first cylinder space and a second connecting conduit containing a control valve extends from the inlet port to the second cylinder space. The second connecting conduit has a non-return valve through which pressure medium flows in the direction of the second cylinder space, a third connecting conduit being provided between the first and second connecting conduits.

14 Claims, 11 Drawing Figures

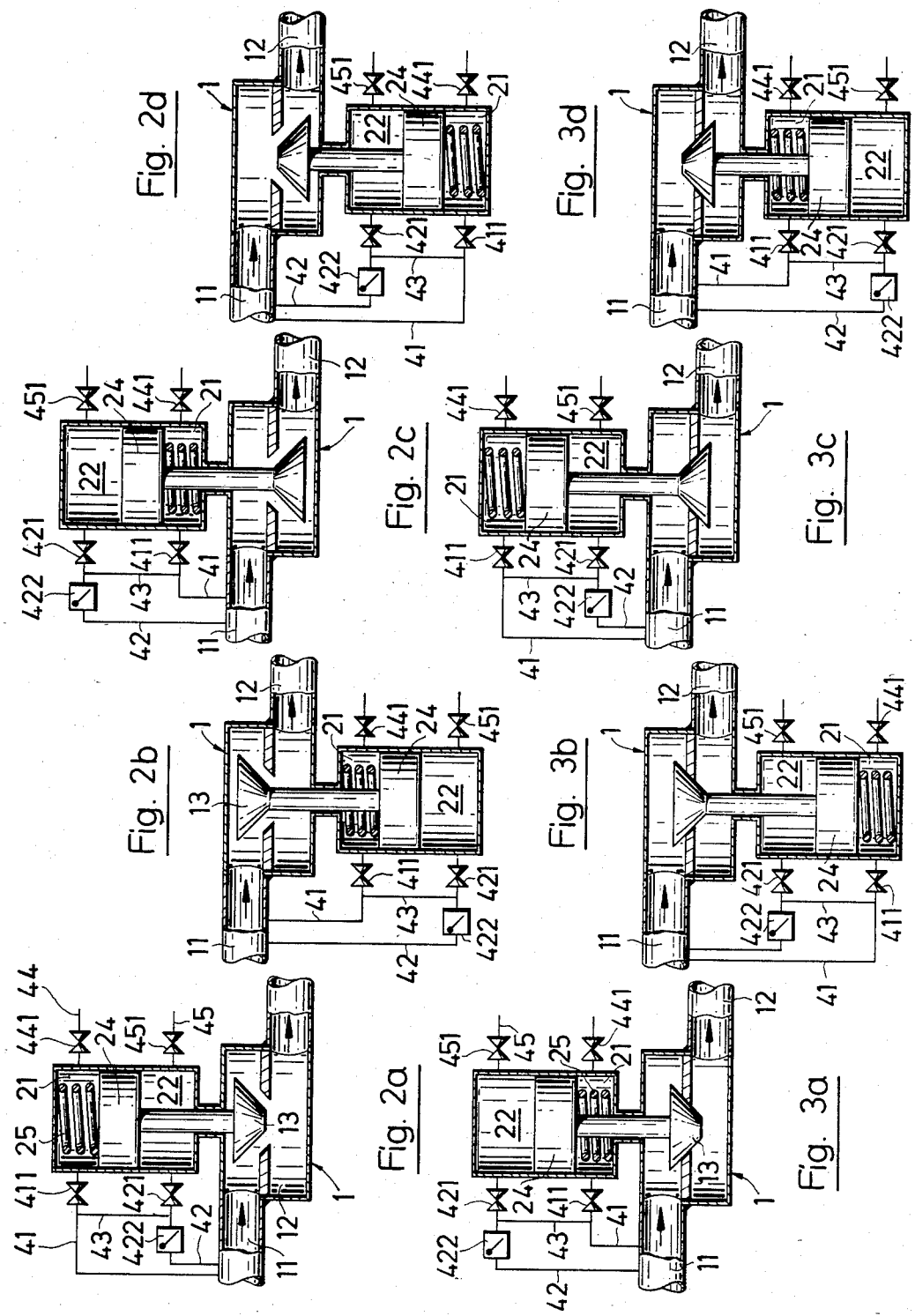

PRESSURE MEDIUM ACTUATED VALVE

This invention relates to a pressure medium actuated valve.

Heretofore, various types of pressure medium actuated valves have been known. For example, one known such valve has a valve body with a movable closure member which can be actuated via a servopiston which is slidably disposed in a cylinder connected to the valve body. The piston also sub-divides the cylinder into two spaces, each of which is connected to a relief conduit in which a control valve is disposed while additional conduits connect each cylinder space to a pressure zone of an inlet port of the valve body. In addition, control valves are provided in each connecting conduit to control the flow.

In a valve of this kind, the closure member can be moved by the opening and closing of the respective control valves in the connecting and relief conduits. The closing and opening time of the closure member is thus constant and depends on the design characteristics of the valve, particularly, the pressure ratios and the valve dimensions. However, this presents an unfavorable feature in that the closing and opening time cannot be readily changed.

Further, although the control valves usually take the form of simple remote-controlled solenoid valves which are reliable, robust and inexpensive these valves can take up only two positions, i.e., "open" and "closed". Thus, these control valves do not allow the opening cross-section to be adjusted in a simple manner. While this is satisfactory enough for normal valve operation and insures operation conditions which can be calculated in advance; the special demands made on the operational safety and efficiency of a valve used as a safety valve often require that the valves be checked rather frequently. Due to the abrupt closure operation, frequent actuation of such valves for testing purposes under normal operational conditions stresses the valve seat surfaces heavily. These surfaces thus wear quickly and increase the risk of leakage and, therefore, appreciably shorten the life of the valves. Still further, the frequent pressure surges due to the abrupt closure operation heavily stress the pressure conduit connected to the valve.

In order to avoid the above problems, it has been suggested to move the closure member slowly during valve examination or testing. The purpose of this was to enable the valve to be moved into the safety position either quickly or slowly, as required. One possible way of doing this is to provide a second control valve in either the relief conduit of the second cylinder space and/or in the first connecting conduit with the second control valve in parallel to the existing control valve. In addition, the additional control valve would be provided with a smaller flow cross-section than in the existing control valve. In this case, the control valve of larger cross-section would be used to actuate the valve for normal operation while the control valve of smaller cross-section would be used for operational testing.

However, in practice, a method of the above type is usually impossible to adopt since, in cases in which safety demands are particularly high, two or more control valves are usually connected in parallel and/or in series for redundancy reasons. In such cases, there is not enough space to accomodate an additional control valve with a control circuit. Moreoever, any additional control valve increases the risk of an accident and complicates the whole valve control system in general.

Accordingly, it is an object of the invention to provide a pressure medium actuated valve which can be moved into a safety position at two different speeds as required in a very simple, reliable and inexpensive manner.

Briefly, the invention provides a pressure medium actuated valve which has a body with a pressure zone, an inlet port for connection to a pressure medium source in order to deliver a pressure medium to the pressure zone, an outlet port and a cylinder sealingly spaced from the pressure zone. In addition, a closure member is provided for selectively opening and closing the outlet port while a servopiston is slidably disposed in the cylinder to sub-divide the cylinder into a first cylinder space which increases in size during transition of the servopiston from a working position to a safety position and a second cylinder space which decreases in size during this transition.

A rod is also provided to connect the servopiston to the closure member to permit movement of the closure member with the servopiston. Also, at least one spring is provided in the cylinder to bias the servopiston towards the safety position.

In known manner, a relief conduit extends from the first cylinder space to at least one pressure medium sink while a control valve is provided in the relief conduit. Likewise, a second relief conduit extends from the second cylinder space to at least one pressure medium sink with a control valve in this conduit.

In addition, a first connecting conduit communicates the pressure zone in the valve body with the first cylinder space with at least one control valve therein while a second connecting conduit communicates the pressure zone with the second cylinder space and with at least one control valve therein.

In accordance with the invention, a non-return valve is provided in the second connecting conduit for preventing a flow of pressure medium from the second cylinder space to the pressure zone. In addition, a first flow path is formed to extend through the first connecting conduit, the first cylinder space and the first relief conduit up to the control valve therein while a second flow path extends through the second connecting conduit from the non-return valve, the second cylinder space and the second relief conduit up to the control valve therein. Further, a third connecting conduit connects the first flow path with the second flow path.

As a result, in normal valve operation, the closure member can still be moved at the required high speed. However, the closure member can be moved at a lower speed during examination or test operation thus reducing wear on the valve seat surfaces.

Thus, even if frequently tested, there is little risk that the valve will leak. Hence, the life of the valve can be prolonged.

One particular advantage of the valve is that the construction can be very simple since no additional control valves are required. In this regard, the third connecting conduit can be disposed between the first and second connecting conduits or between both relief conduits, or may consist of a bore in the piston which connects the two cylinder spaces. This affords the manufacturer with a great deal of freedom in constructing the valve.

Another advantage is that the behavior of the valve can be calculated in advance during test operation.

The first control valve and the control valve in the first connecting conduit can be coupled so that when one valve is open, the other valve is closed and vice versa. Likewise, the second control valve and the control valve in the second connecting conduit can be coupled so that when one valve is closed, the other valve is open and vice versa. This coupling of the control valves can be used in both normal and test operation and enables pairs of control valves with a single control conduit to be actuated simultaneously for both operational modes. The coupling of the control valves and pairs also reduces possible valve operating errors.

The valve may also be provided with an external medium conduit connected to the third connecting conduit in order to deliver a pressurized medium thereto as well as with a non-return valve in the external medium conduit to prevent a back flow of medium. This enables the closure member to be moved into the working position by means of an external medium in the absence of pressure in the pressure medium system.

In one embodiment, a double-action non-return valve can be connected in the third connecting conduit with an external medium conduit connected to the double-action valve in order to deliver a pressure medium thereto. In this case, the double-action valve has a first position communicating the first flow path with the second flow path and a second position communicating the external medium conduit with the second flow path. This construction enables external medium to be supplied in a very simple, reliable and inexpensive manner.

The double-action valve may also be biased in a direction to close off the external medium conduit. This prestressing clearly determines the behavior of the external medium supply in the unpressurized condition of the valve. Thus, the biasing prevents undesirable positions of the closure member of the double-action valve.

Each control valve of a respective connecting conduit may also be disposed between the cylinder and the third connecting conduit. This arrangement secures the cylinder spaces against any undesirable admission of pressure medium. Thus, the valve may be controlled very precisely even during operational testing. Precise or accurate control relates to the width of the range over which the closing and opening times may vary. Hence, it is very important to maintain very narrow ranges of variation since important conclusions concerning the frictional and sealing conditions inside the valve can be drawn from any deviations from the normal closing time.

The valve may also be provided with a constriction in the first connecting conduit for calibrating a flow of pressure medium therethrough. This further enhances accuracy since the constriction allows an improved pre-calculation and calibration of the quantity of pressure medium flowing through the constriction. Further, the third connecting conduit may be connected to the first flow path between the constriction and the cylinder. This makes the pressure medium flow in testing operation independent of the pressure medium flow through the constriction in the first connecting member for normal operation.

A constriction may also be provided in the third connecting conduit. Thus, the pressure medium flow required for testing operation can be very precisely pre-calculated and calibrated so that the time required for transition to the safety position of the closure member during testing operation can be very accurately pre-determined.

A constriction may also be provided in the first relief conduit. This permits the pressure medium flow emerging from the first cylinder space during the transition of the valve to the working position to be determined more satisfactorily by calculation so that the calibration of the flow of medium in the relief conduit is enhanced. As a result, the behavior of the valve can be more satisfactorily controlled during transition into the working position, during either testing or normal operation. A further advantage derives from the fact that, if a heavy enough constriction is selected, the valve can be held in the safety position by a continuous supply of pressure medium even if the control valve in the particular relief conduit fails or is torn off.

In order to prevent the movable system consisting of the servopiston, rod and closure member from impinging two fast on the associated matching surface in the respective end positions, the third connecting conduit is connected to the first flow path between the first cylinder space and the control valve in the first connecting conduit and to the second flow path between the second cylinder space and the control valve in the second connecting conduit. This enables the closure member to be braked during movement into the respective end positions so that the movable system impinges on the associated matching surface at a sufficiently lower speed, i.e., without causing damage.

Very advantageously, the braking effect is produced without the need for additional moving parts, for example valves.

These and other objects and advantages of the invention will become more apparent for the following detailed description taken in conjunction with the accompanying drawings wherein:

FIG. 1 illustrates a section view through a pressure medium actuated valve according to the invention;

FIGS. 2a to d illustrate four embodiments of the valve according to the invention simplified as against FIG. 1;

FIGS. 3a to d illustrate four embodiments of the valve according to the invention in which the working position is the closure position;

FIG. 4 illustrates a variant of the construction illustrated in F. 2a; and

Figure 1:
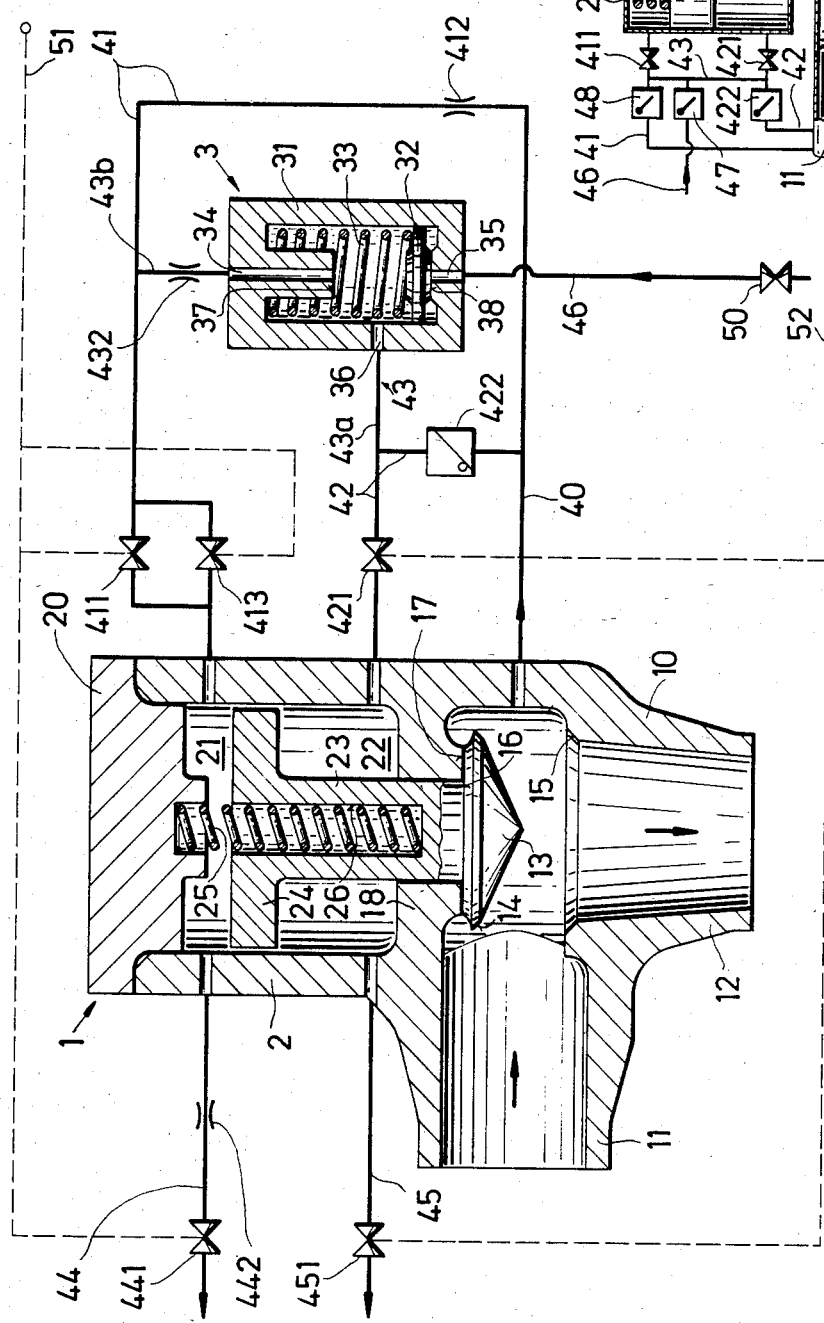
FIG. 1 illustrates a pressure medium actuated valve in a simplified way, since, in practice, all the control and non-return valves, as well as the conduits with the constrictions, can be contained within the outline of the valve.

Referring to FIG. 1, the valve 1 has a body 10 and a cover 20 attached in seal-tight relationship to the body 10 by means of screws (not shown). The body 10 has a pressure zone, an inlet port 11 for connection to a pressure medium source (not shown) in order to deliver a pressure medium to the pressure zone and an outlet port 12 through which the pressure medium is expelled.

A closure member 13 is disposed to move in the pressure zone of the body 10 and has a conical sealing surface 14 on the side adjacent the outlet port 12 which bears against a sealing seat 15 in the body 10 when the valve 1 is closed. On the side remote from the outlet port 12, the closure member 13 has a rear seat 16 which bears in seal-tight relationship against a stop surface 17 in the body 10 when the closure member 13 is in the completely open position.

The body 10 also has a cylinder 2 which extends towards the cover 20 and in which a servopiston 24 is slidably disposed. The piston 24 is rigidly connected by a rod 23 to the closure member 13 so as to permit movement of the member 13 with the piston 24. In addition, the piston 24 sub-divides the space enclosed by the cylinder 2 into a first cylinder space 21 and a second cylinder space 22. The rod 23 extends through a cylinder end 18 which separates the second cylinder space 22 from the pressure zone of the body 10 in every position of the closure member 13. The end 18 has sealing means (not shown) which enclose the rod 23.

A helical compression spring 25 is disposed in the first cylinder space 21 between the cover 20 and the end of a bore 26 extending through the piston 24 so as to bias the piston 24 towards a safety position and away from a working position.

The pressure in the pressure zone of the body 10 is transmitted to a distributing conduit 40 connected to the valve body 10. The distributing conduit 40 is connected via a first connecting conduit 41 to the first cylinder space 21 and via a second connecting conduit 42 to the second cylinder space 22. The first connecting conduit 41 and the second connecting conduit 42 are interconnected via a third connecting conduit 43 comprising two portions 43a and 43b.

The first cylinder space 21 is connected to a pressure medium sink, in this case atmosphere, via a relief conduit 44 containing a solenoid control valve 441 as well as a constriction 442 between the control valve 441 and the first cylinder space 21. The second cylinder space 22 is connected to a pressure medium sink, also atmosphere, via a relief conduit 45 which contains a solenoid control valve 451.

The first connecting conduit 41 contains two solenoid valves 411, 413 connected in parallel and disposed between the connection place of the portion 43b and the first cylinder space 21. The conduit 41 also contains a constriction 412 between the connection place on the distributing conduit 40 and that of the portion 43b. The portion 43b also has a constriction 432.

The second connecting conduit 42 has a solenoid control valve 421 which is disposed between the second cylinder space 22 and the connection place of the portion 43a. The conduit 42 also has a non-return valve 422 through which medium flows in the direction of the second cylinder space 22 and which is disposed between the connection places on the portion 43a and the distributing conduit 40.

A double-action non-return valve is disposed between the portions 43a, 43b of the third connecting conduit and comprises a valve body 31, a closure plate 32 and a spring 33. The body 31 is connected via a bore 34 to the portion 43b, while the other end of the body 31 is formed with a bore 35 connected to an external medium conduit 46. The body 31 also contains a third bore 36 which is disposed between the two bores 34 and 35 and is connected to the portion 43a. The spring 33 loads the closure plate 32 in the direction of the bore 35. At each of the two end faces, the closure plate 32 has a sealing surface, the sealing surfaces co-operating in one end position of the plate 32 with a sealing seat 37 on the bore 34, and in the other end position with a sealing seat 38 on the bore 35. The closure plate 32 which can move in the body 31 between two end positions blocks off either the bore 35, in which case the bores 34 and 36 communicate with one another (position shown in FIG. 1), or blocks off the bore 34, in which case the bores 35, 36 communicate with one another.

The solenoid valves 441, 411 and 413 are simultaneously actuated by a single control conduit 51, the solenoid valve 441 being closed and the solenoid valves 411 and 413 open when there is no current in the conduit 51. The solenoid valves 451 and 421 are also simultaneously actuated by a single control conduit 52, the solenoid valve 451 being open and the solenoid valve 421 closed when there is no current in the conduit 52.

A first flow path thus extends through the first connecting conduit 41, the first cylinder space 21 and the relief conduit 44 up to the control valve 441 while a second flow path extends through the second connecting conduit 42 from the non-return valve 422, the second cylinder space 22 and the relief conduit 45 up to the control valve 451.

The valve described operates as follows:

With the valve 1 open, pressure medium flows out of the pressure medium source, for example, a steam generator, via the inlet port 11 into the valve body 10 and leaves via the outlet port 12. In normal operation, the solenoid valves 441, 411 and 413 are controlled by the flow in the control conduit 51, so that the solenoid valve 441 is open and the solenoid valves 411 and 413 are closed. In contrast, during normal operation there is no current in the control conduit 52, so that the solenoid valve 451 is open and the solenoid valve 421 is closed. The first cylinder space 21 is connected to atmosphere via the open solenoid valve 441, the constriction 442 and the relief conduit 44, just like the second cylinder space 22, due to the open solenoid valve 451 in the relief conduit 45. As a result, no differential pressure operates on the piston 24; the resulting force from the product of atmospheric pressure multiplied by the various piston surfaces in the two cylinder spaces 21 and 22 is negligibly low. In contrast, the resulting force from the product of the pressure of the medium multiplied by the difference of the two end faces of the closure member 13 is high enough to retain the closure member 13 in the open position against the force of the helical compression spring 25, the rear seat 16 being pressed tightly against the stop surface 17.

Substantially the same pressure of the medium exists in the distributing conduit 40, connecting conduits 41 and 42, up to the solenoid valves 411, 413 and 421, and the portions 43a, 43b as in the inlet port 11. The external medium conduit 46 is unpressurized, since a valve 50 in that conduit blocks off the supply of external medium. In the double-acting non-return valve 3, therefore, the closure plate 32 is pressed tightly against the sealing seat 38 by the pressure of the medium in the body 31 and by the spring 33.

The closure of valve 1 is initiated either by the operating personnel or automatically by an accident in the installation, the current in the control conduit 51 being switched off. As a result the solenoid valve 441 closes, and the solenoid valves 411, 413 open. In a fraction of a second, which depends on the cross-section of the constriction 412, pressure medium flows via the conduits 40, 41 into the first cylinder space 21. As a result, the piston 24, together with the rod 23 and the closure member 13, is pushed into the closure—i.e., safety position. When there is a current in the control conduit 51 again, the solenoid valve 441 opens, and the solenoid valves 411, 413 close, so that the pressure in the first cylinder space 21 drops to atmospheric pressure. At the same time, as a current is supplied to the conduit 51, the control conduit 52 also receives a current, so that the solenoid valve 451 closes and the solenoid valve 421 opens. As a result, pressure medium passes into the second cylinder space 22, thus initiating a movement of the closure member 13 in the opening direction. When the open position has been reached, the current is again cut off from the control conduit 52, so that the solenoid valve 451 opens and the solenoid valve 421 closes. In this way, normal operating conditions are restored.

The constriction 442 limits the quantity of medium flowing per second out of the first cylinder space 21, in order to increase the opening time of the valve 1 and therefore avoid pressure surges in the pressure conduits of the installation. The constriction 442 also performs the important function of enabling the valve 1 to be closed and kept closed if the solenoid valve 441 fails or is even totally destroyed, the constriction 442 enabling pressure to be dammed in the first cylinder space 21, accompanied by a continuous making-up of pressure medium via the solenoid valves 411, 413, which are then opened.

The efficiency of valve 1 is tested in two steps. In a first step, the control conduit 52 receives a current, so that the solenoid valve 451 is closed and the solenoid valve 421 opened. As a result, the second cylinder space 22 is filled with pressure medium, which forms a pressure cushion. In a second step, the current is cut off from the control conduit 51, whereafter the solenoid valve 441 closes and the solenoid valves 411, 413 open. The first cylinder space 21 is then acted upon by pressure medium, and there is substantially the same pressure in the cylinder spaces 21 and 22 as in the inlet port 11. The forces exerted by the pressure on the movable system are therefore substantially equalized, and the sole force of the helical compression spring 25 tends to close the valve 1. Pressure medium flows out of the second cylinder space 22 via the second connecting conduit 42, the portion 43a of the third connecting conduit 43, the double-acting non-return valve 3, the constriction 432 in the portion 43b and the first connecting conduit 47 into the first cylinder space 21, the valve 1 slowly closing. The closing speed is determined more particularly by the quantity of pressure medium per unit of time admitted by the constriction 432. The nonreturn valve 422 prevents pressure medium from flowing out of the second cylinder space 22 into the distributing conduit 40. In the case of incompressible pressure media, the necessary additional quantity for the filling of the first cylinder space 21 is supplied from the pressure zone of the body 10 via the conduits 40, 41.

The following are the essential points of test operation: first, the preliminary formation of a pressure cushion in the second cylinder space 22, thus substantially facilitating the controlled closure of the valve 1 and, second, the determination of the flow quantity from the second cylinder space 22 to the first cylinder space 21 by means of the only constriction 432, so that the closure time of the valve 1 can be very accurately determined. The closing time can be measured in known manner, and any deviations of the measured value from a required value can provide important information concerning any defects in the valve 1 such as, for example, leakages, dirtying or deformations.

Any contact between the sealing surface 14 of the closure member 13 and the sealing seat 15 can be avoided during test operation if, shortly before the closure position is reached (having regard to the inertia of the moveable system) a current is fed to the control conduit 51. As a result, the solenoid valve 441 is opened and the solenoid valves 411, 413 closed, so that the pressure in the first cylinder space 21 drops to atmospheric pressure, and the closure member 13 reverses the direction of movement just before contact with the sealing seat 15, so that the valve 1 opens. Premature wear on the sealing surfaces is therefore completely obviated. For the full restoration of normal operation, the current to the control conduit 52 is then interrupted, so that the solenoid valve 451 opens and the solenoid valve 421 closes. The pressure in the second cylinder space 22 then also drops to atmospheric pressure.

With an absence of pressure in the pressure zone of body 10, there is also an absence of pressure in all the other conduits and spaces of the valve 1. The valve 1 is then kept closed by the helical compression spring 25, and the closure plate 32 of the double-acting non-return valve 3 is held by the spring 33 on the seat 38 whereby the external medium conduit 46 is blocked. The valve 1 can thus be opened only by introducing external medium via the external medium conduit 46. To this end, the control conduit 52 first receives a current, so that the solenoid valve 451 closes and the solenoid valve 421 opens. The opening of the valve 50 connects the external medium conduit 46 to a source (not shown) of external medium. The external medium pressure acts via the bore 35 on the closure plate 32, displacing the latter against the force of the spring 33 as far as the sealing seat 37 adjoining the bore 34. The external medium then flows via the bore 36, the portion 43a, and the second connecting conduit 42 into the second cylinder space 22, the piston 24 and therefore the control member 13 being pushed into the opening position. The closure plate 32 and the non-return valve 422 prevent external medium from getting into the portion 43b and the conduits 41 and 40. The closure of the valve 50 and/or the supply of pressure medium from the inlet port 11 at a pressure higher than that of the external medium, together with an interruption of the supply of current to the control conduit 52, restores normal operation.

More than one external medium source can also be connected optionally to the external medium conduit 46 or, each via an external medium conduit with a double-acting non-return valve, to the third connecting conduit. For safety reasons, the valve 1 can have various redundancies. In the embodiment illustrated in FIG. 1 only the solenoid valves 411, 413 which are connected in parallel are used as an example of such a redundancy, since safety requirements are particularly high. In dependence on requirements and spatial requirements, however, further redundancies can be provided, for example, two parallel helical compression springs 25 can be used.

In special cases, the relief conduit 45 of the second cylinder space 22 can also have a constriction, to further refine the control accuracy of the valve.

Referring to FIGS. 2a to 2d, wherein like reference characters indicate like parts as above, the illustrated embodiments of the valve 1 are shown in the simplest form. In each case, the valve 1 is shown in an open position which is the working position. However, there is no supply of any external medium.

In their simplicity, the valve embodiments illustrated in FIGS. 3a to 3d correspond to those shown in FIGS. 2a to 2d, although the former are closed in their working position, the open position being the safety position.

In FIGS. 2a to 2d and 3a to 3d, the valves 1 are shown in their working position. Their operation can be gathered from the description of FIG. 1. The embodiments illustrated in FIGS. 2b, 3c and 3d merely have the special feature that they remain in the working position only if the second cylinder space 22 is pressurized. This means, in contrast with the other examples, that in the working position of the valve 1, as shown in FIGS. 2b, 3c and 3d the solenoid valve 451 must be closed and the solenoid valve 421 open, the solenoid valve 451 being opened and the solenoid 421 closed on transition to the safety position. However, the solenoid valves 451 and 421 must not be actuated during operational testing.

The embodiments illustrated in FIGS. 2a to 2d and 3a to 3d therefore illustrate the many various possible uses, if a pressure medium actuated valve with two different opening or closing times is to be actuated.

Figure 4:
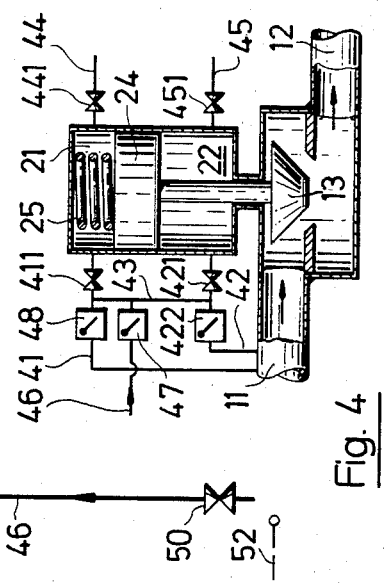

Referring to FIG. 4 wherein like reference characters indicate like parts as above, the valve may be constructed in similar manner to that shown in FIG. 2, although an external medium conduit 46 is provided which is connected via a non-return member 47 to the third connecting conduit 43. The non-return member 47 can be flowed through by the medium in the direction of the conduit 43. A non-return member 48 is also provided in the first connecting conduit 41, upstream of the connecting place of the third connecting conduit 43. The non-return member 48 is flowed through by the pressure medium in the direction of the connecting place just mentioned. Normal closure members can also be used, instead of the nonreturn members 47, 48. Correspondingly, the embodiments illustrated in FIGS. 2b to 2d and also FIGS. 3a to 3d can be provided with an external medium supply.

Figure 5:
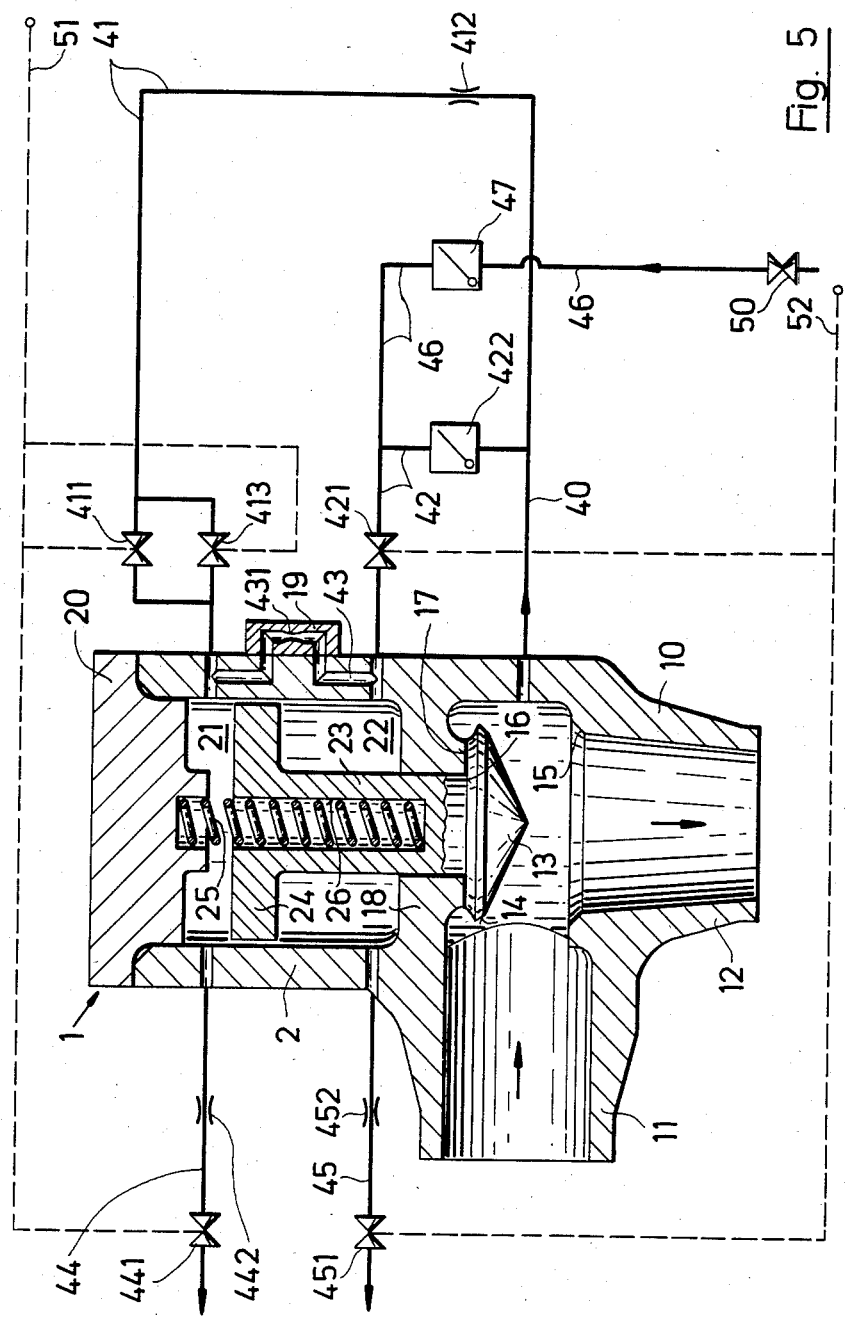
FIG. 5 illustrates a further embodiment in accordance with the invention.

Referring to FIG. 5, wherein like reference characters indicate like parts as above, the two flow paths are interconnected via a third connecting conduit 43 which lies with its two mouths on the cylinder side of the valves 411, 413 provided in the first connecting conduit 41, and of the valve 421 provided in the second connecting conduit 42. In this embodiment a major part of the third connecting conduit extends through the wall of the cylinder 2. The remaining portion of the third connecting conduit 43 has a constriction 431 formed in a removable wall part 19 which is releasably attached from outside to the cylinder 2 by means of screws (not shown). This enables the constriction to be readily interchanged, either for replacement by a constriction of the same size, or by a throttle of larger or smaller flow cross-section.

When the valve shown in FIG. 5 is open, the same conditions are present as those described in relation to the valve shown in FIG. 1. As shown in FIG. 5, the closure of the valve 1 is triggered either by the operating personnel or automatically by an accident in the plant, the current in the control conduit 51 being switched off. As a result, the solenoid valve 441 closes, and the valves 411, 413 open. In a fraction of a second, which depends on the cross-section of the constriction 412, pressure medium flows via the conduits 40, 41 into the first cylinder space 21. As a result, the servopiston 24, together with the rod 23 and the closure member 13, is displaced downwards—i.e., in the direction of the closure or safety position. In the first place, the full pressure of the pressure medium in the first cylinder space 21 acts on the piston 24, while due to the constriction 431 in the third connecting conduit 43 such pressure is not yet operative in the second cylindeer space 22. The piston 24 therefore first moves relatively quickly downwards, the second cylinder space 22 becoming reduced in size, and a pressure building up therein which lies between the pressure in the first cylinder space and atmospheric pressure. Some pressure medium escapes via the relief conduit 45. During the continued movement of the piston 24, pressure medium also passes via the third connecting conduit 43 into the second cylinder space 22, so that the pressure therein is raised slightly further. Due to this, the piston movement is at first slightly and then increasingly braked—i.e., the movable system moves at a constantly decreasing speed into the bottom end position. The closure member 13 is therefore applied to the seat surface 15 without any possible damage to such surface or to the sealing surface 14. The braking effect is determined by the dimensioning of the cross-sections of the constrictions 431, 452.

When the control conduit 51 again receives the current, the solenoid valve 441 opens, and the valves 411 and 413 close, so that the pressure in the first cylinder space 21 drops to atmospheric pressure. At the same time as the current is supplied to the conduit 51, the control conduit 52 also receives a current, so that the solenoid valve 451 closes and the valve 421 opens. As a result, pressure medium passes into the second cylinder space 22, thus initiating a movement of the closure member 13 in the opening direction. During such opening movement, a braking effect of the movable system takes place in the same way as disclosed hereinbefore for the downward movement.

When the open position has been reached, the control conduit 52 is again without a current, so that the solenoid valve 451 opens and the valve 421 closes, and normal operating conditions are restored.

The constriction 442 also performs the important function of enabling the valve 1 to be closed and kept closed if the solenoid valve 411 fails or is even completely destroyed, the constriction 442 enabling pressure to be dammed in the first cylinder space 21, accompanied by a continuous stowage of pressure medium via the solenoid valves 411, 413 which are then opened.

What is claimed is:

1. A pressure medium actuated valve comprising
   a body having a pressure zone, an inlet port for connection to a pressure medium source to deliver a pressure medium to said zone, an outlet port, and a cylinder sealingly spaced from said zone;
   a closure member for selectively opening and closing said outlet port;
   a servopiston slidably disposed in said cylinder to sub-divide said cylinder into a first cylinder space which increases in size during transition of said servopiston from a working position to a safety position and a second cylinder space which decreases in size during said transition;
   a rod connecting said servopiston to said closure member to permit movement of said closure member with said servopiston;
   at least one spring in said cylinder for biasing said servopiston towards said safety position;
   a first relief conduit extending from said first cylinder space to at least one pressure medium sink;
   a first control valve in said first relief conduit;
   a second relief conduit extending from said second cylinder space to at least one pressure medium sink;
   a second control valve in said second relief conduit;
   a first connecting conduit communicating said pressure zone in said body with said first cylinder space;

at least one control valve in said first connecting conduit;

a second connecting conduit communicating said pressure zone in said body with said second cylinder space;

at least one control valve in said second connecting conduit;

a non-return valve in said second connecting conduit for preventing a flow of pressure medium from said second cylinder space to said pressure zone;

a third connecting conduit connecting a first flow path with a second flow path, said first flow path extending through said first connecting conduit, said first cylinder space and said first relief conduit to said first control valve and said second flow path extending through said second connecting conduit from said non-return valve, said second cylinder space and said second relief conduit to said second control valve;

a double-action non-return valve connected in said third connecting circuit; and an external medium conduit connected to said double-action valve to deliver a pressure medium thereto, said double-action valve having a first position communicating said first flow path with said second flow path and a second position communicating said external medium conduit with said second flow path.

2. A control valve as set forth in claim 1 wherein said first control valve and said control valve in said first connecting conduit are coupled so that when one valve is open the other valve is closed, and vice versa, and wherein said second control valve and said control valve in said second connecting conduit are coupled so that when one valve is closed the other valve is open and vice versa.

3. A control valve as set forth in claim 1 which further comprises an external medium conduit connected to said third connecting conduit to deliver a pressurized medium thereto and a non-return valve in said external medium conduit to prevent a back flow of medium therein.

4. A control valve as set forth in claim 1 wherein said double-action valve is biased in a direction to close off said external medium conduit.

5. A control valve as set forth in claim 1 wherein each said control valve in a respective connecting conduit is disposed between said cylinder and said third connecting conduit.

6. A control valve as set forth in claim 1 which further comprises a constriction in said first connecting conduit for calibrating a flow of pressure medium therethrough.

7. A control valve as set forth in claim 6 wherein said third connecting conduit is connected to said first flow path between said constriction and said cylinder.

8. A control valve as set forth in claim 1 which further comprises a constriction in said third connecting conduit.

9. A control valve as set forth in claim 8 which further comprises a constriction in said second relief conduit with at least the same flow cross-section as said constriction in said third connecting conduit.

10. A control valve as set forth in claim 1 which further comprises a constriction in said first relief conduit.

11. A control valve as set forth in claim 1 wherein said third connecting conduit is connected to said first flow path between said first cylinder space and said control valve in said first connecting conduit and to said second flow path between said second cylinder space and said control valve in said second connecting conduit.

12. A control valve as set forth in claim 11 wherein said third connecting conduit extends at least in part in said body.

13. A control valve as set forth in claim 12 which further comprises a removable wall portion mounted on said cylinder to define a part of said third connecting conduit and a constriction within said wall portion for calibrating a flow through said third connecting conduit.

14. A pressure medium actuated valve comprising a body having a pressure zone, an inlet port for connection to a pressure medium source to deliver a pressure medium to said zone, an outlet port, and a cylinder sealingly spaced from said zone;

a closure member for selectively opening and closing said outlet port;

a servopiston slidably disposed in said cylinder to sub-divide said cylinder into a first cylinder space which increases in size during transition of said servopiston from a working position to a safety position and a second cylinder space which decreases in size during said transition;

a rod connecting said servopiston to said closure member to permit movement of said closure member with said servopiston;

at least one spring in said cylinder for biasing said servopiston towards said safety position;

a first relief conduit extending from said first cylinder space to at least one pressure medium sink;

a first control valve in said first relief conduit;

a second relief conduit extending from said second cylinder space to at least one pressure medium sink;

a first connecting conduit communicating said pressure zone in said body with said first cylinder space;

at least one control valve in said first connecting conduit;

a second connecting conduit communicating said pressure zone in said body with said second cylinder space;

at least one control valve in said second connecting conduit;

a non-return valve in said second connecting conduit for preventing a flow of pressure medium from said second cylinder space to said pressure zone;

a third connecting conduit connecting a first flow path with a second flow path, said first flow path extending through said first connecting conduit, said first cylinder space and said first relief conduit to said first control valve and said second flow path extending through said second connecting conduit from said non-return valve, said second cylinder space and said second relief conduit to said second control valve, said third connecting conduit being connected to said first flow path between said first cylinder space and said control valve in said first connecting conduit and to said second flow path between said second cylinder space and said control valve in said second connecting conduit;

a removable wall portion mounted on said cylinder to define a part of said third connecting conduit; and a constriction within said wall portion for calibrating a flow through said third connecting conduit.

* * * * *